(12) United States Patent
Sano et al.

(10) Patent No.: US 10,281,667 B2
(45) Date of Patent: May 7, 2019

(54) CONNECTOR ASSEMBLY AND CONNECTOR DEVICE UTILIZING SAME

(71) Applicant: Hirose Electric Co., Ltd., Shinagawa-ku, Tokyo (JP)

(72) Inventors: Yoshiaki Sano, Tokyo (JP); Kazuya Shimakura, Tokyo (JP)

(73) Assignee: HIROSE ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/866,313

(22) Filed: Jan. 9, 2018

(65) Prior Publication Data

US 2018/0210157 A1    Jul. 26, 2018

(30) Foreign Application Priority Data

Jan. 23, 2017  (JP) ................. 2017-009180

(51) Int. Cl.
  *G02B 6/42*  (2006.01)
  *H01R 12/57*  (2011.01)
  (Continued)

(52) U.S. Cl.
  CPC ........... *G02B 6/4292* (2013.01); *G02B 6/387* (2013.01); *G02B 6/3893* (2013.01); *G02B 6/3897* (2013.01); *G02B 6/4214* (2013.01); *H01R 12/57* (2013.01); *H01R 12/75* (2013.01); *H01R 13/4368* (2013.01); *H01R 13/6275* (2013.01); *G02B 6/4246* (2013.01); *G02B 6/4261* (2013.01); *G02B 7/008* (2013.01); *H01R 12/714* (2013.01); *H01R 12/716* (2013.01); *H04B 10/801* (2013.01)

(58) Field of Classification Search
  CPC ...... H01R 12/57; H01R 12/73; H01R 12/707; H01R 12/712; H01R 13/08; H01R 13/20; H01R 13/6275; H01R 12/716; H01R 12/07; H01R 12/75; H01R 12/714; H01R 13/716; H01R 13/4368; H01L 2924/14; H04B 10/801; G02B 6/4292; G02B 6/387; G02B 6/3893; G02B 6/3897; G02B 6/4214; G02B 6/4246; G02B 6/4261; G02B 7/008
  USPC .... 385/88–94; 439/374, 625, 626, 660, 676, 439/74; 398/117, 130, 131, 138, 139
  See application file for complete search history.

(56) References Cited

U.S. PATENT DOCUMENTS

2014/0315419 A1* 10/2014 Ishida ............... H01R 12/7052
  439/374

FOREIGN PATENT DOCUMENTS

JP    2004-29342 A    1/2004

* cited by examiner

*Primary Examiner* — Michael P Mooney
(74) *Attorney, Agent, or Firm* — Procopio, Cory, Hargreaves & Savitch LLP

(57) ABSTRACT

A connector assembly having a first member and a second member, wherein the first member has a substrate with a face extending in the fore-and-aft and side-to-side directions, resilient members, contacts, and locking portions. The substrate is provided with inclined faces gradually approaching said face in the fore-and-aft direction. The second member has a housing, electrical contact portions, and counterpart locking portions. As the second member is guided along the inclined faces and approaches said face, the contacts and electrical contact portions are brought into electrical contact and the second member is biased as a result of contact with the resilient members. At the same time, the counterpart locking portions of the second member are engaged by the locking portions of the first member.

15 Claims, 11 Drawing Sheets

(51) Int. Cl.
*G02B 6/38* (2006.01)
*H04B 10/80* (2013.01)
*H01R 13/436* (2006.01)
*H01R 12/75* (2011.01)
*H01R 13/627* (2006.01)
G02B 7/00 (2006.01)
H01R 12/71 (2011.01)

(a)

(b)

CONNECTOR ASSEMBLY AND CONNECTOR DEVICE UTILIZING SAME

CROSS REFERENCE TO RELATED APPLICATIONS

This Paris Convention Patent Application claims benefit under 35 U.S.C. § 119 and claims priority to Japanese Patent Application No. JP 2017-009180, filed on Jan. 23, 2017, titled "CONNECTOR ASSEMBLY AND CONNECTOR DEVICE UTILIZING SAME", the content of which is incorporated herein in its entirety by reference for all purposes.

BACKGROUND

Technical Field

The present invention relates to a connector assembly having a first member and a second member that can be attached thereto, as well as to a connector device utilizing this connector assembly.

Background Art

Patent Document 1 (Japanese Patent Application Publication No. 2004-29342) has disclosed a connector assembly, which has a first member and a second member that can be attached thereto, and which is, in particular, an optical communication module. In conventional optical communication modules, due to the fact that electrical connections are established by melting solder, a heat treatment step is added for solder melting, etc., during reflow and soldering. In optical communication modules, such a heat treatment step induces thermal stress in their internal optical elements and driving circuitry and plays a role in causing them to be damaged or fail. In order to solve this problem, the optical communication module of Patent Document 1 makes it possible for an optical communication module to be anchored to a mounting board with screws without involving a heat treatment step.

PRIOR ART DOCUMENT

Patent Documents

[Patent Document 1]
Japanese Patent Application Publication No. 2004-29342.

SUMMARY

Problems to be Solved by the Invention

The optical communication module of Patent Document 1 can certainly provide a solution to the problem of thermal stress during mounting. However, due to the fact that the optical communication module is anchored with screws, it is an onerous operation that leads to new problems, such as lower productivity and higher costs.

The present invention was made in order to solve the problems of the above-described prior art, and it is an object thereof to provide a connector assembly, as well as a connector device utilizing the same, that allows for treatment to be performed without having to consider the above-described problems and an improvement in working efficiency and product reliability can be achieved even when components having certain problems, for example, components having a low thermal or chemical resistance, etc., must be provided in the connector assembly, etc.

Means for Solving the Problems

It is an object of the present disclosure to provide a connector assembly, as well as a connector device utilizing the same, wherein even when components having certain problems related to thermal resistance or the like must be provided therein, treatment can be conducted without having to consider the above-mentioned problems and it is possible to achieve an improvement in working efficiency and product reliability.

In order to eliminate the foregoing problems, the connector assembly according to one aspect of the invention is a connector assembly having a first member and a second member capable of being attached to the first member, said assembly being characterized by the fact that the first member has a substrate with a face extending in the fore-and-aft and side-to-side directions, resilient members, multiple contacts, and locking portions, and the substrate is provided with inclined faces gradually approaching said face in the fore-and-aft direction; the second member has a housing, electrical contact portions, and counterpart locking portions; and, as the second member is guided along the inclined faces and approaches said face, the multiple contacts and electrical contact portions are brought into electrical contact and the second member is biased as a result of contact with the resilient members while at the same time maintaining a state in which the counterpart locking portions of the second member are engaged by the locking portions of the first member and the second member is biased by the resilient members.

In the connector assembly of this aspect, the first and second members are formed as separate components and are adapted for assembly at a later time and, therefore, even when components having certain problems, for example, components having a low thermal or chemical resistance, or the like, must be provided therein, such components are provided either in the first member or the second member, and when the other member is subjected to treatment, the treatment can be conducted without having to consider such problems and it is possible to achieve an improvement in working efficiency and product reliability.

In addition, since the second member is biased via resilient action when the second member is attached to the first member and the first and second members can be engaged by locking means while maintaining a biased state, the second member can be anchored to the first member in a stable manner.

In the above-described connector assembly, the resilient members may display resilience at least in the vertical direction relative to said face, and, as a result of contact with the resilient members, the second member may be biased at least away from said face.

In the above-described connector assembly, at least a portion of the inclined faces are preferably located above a portion of the housing and, at the same time, at least another portion of the inclined faces are preferably located below another portion of the housing when the counterpart locking portions of the second member are engaged at least by the locking portions of the first member.

According to the connector assembly of this aspect, as a result of positioning the inclined faces of the first member both above and below the housing of the second member, the second member is sandwiched by predetermined sections of the first member in the vertical direction, thereby allowing for the second member to be anchored to the first member in a more reliable and stable manner. In addition, once the second member has been attached to the first member, the resilient action of the resilient members biases the second member in the direction of attachment of the second member to the first member, in other words, not in the inclined direction defined by the inclined faces, but in a vertical direction relative to the face of the substrate, as a result of which the resilient action of the resilient members does not interfere with the state of attachment of the first and second members.

In the above-described connector assembly, the inclined faces located above and the inclined faces located below are preferably provided so as to be spaced apart from each other in the fore-and-aft direction.

According to the connector assembly of this aspect, the second member can be anchored to the first member in a more reliable and stable manner by shifting the inclined faces located above and the inclined faces located below in the fore-and-aft direction.

In the above-described connector assembly, the inclined faces are preferably provided in at least one location in the side-to-side direction at the center and/or on at least one of the left and right sides.

According to the connector assembly of this aspect, attachment can be made more stable by providing the inclined faces at appropriate locations depending on how the device is used.

In the above-mentioned connector assembly, at least two groups of the locking portions and the counterpart locking portions are preferably provided so as to be spaced apart from each other in the fore-and-aft direction.

According to the connector assembly of this aspect, as a result of engagement in at least two locations in the fore-and-aft direction, the second member can be attached to the first member in a stable manner.

In the above-mentioned connector assembly, the locking portions are preferably provided in fittings attached to the substrate and/or the counterpart locking portions are preferably provided in a metal shell covering at least a portion of the exterior surface of the housing.

The connector assembly of this aspect makes it possible to eliminate problems such as chipping, damage during locking, and the like, and, in addition, the operation of locking can be easily accomplished in a single step if the locking portions are formed, for example, from a resiliently displaceable metal.

In the above-mentioned connector assembly, the locking portions are preferably formed as part of the substrate and the counterpart locking portions are preferably formed as part of the housing.

According to the connector assembly of this aspect, the attachment of the first and second member can be made more stable by providing locking means on the substrate and on the housing in addition to the locking portions and counterpart locking portions.

In the above-mentioned connector assembly, counterpart inclined faces corresponding to the inclined faces are preferably provided in the housing.

According to the connector assembly of this aspect, the second member can be guided more effectively relative to the first member by providing counterpart inclined faces in the housing in correspondence with the inclined faces provided on the substrate.

In the above-mentioned connector assembly, the substrate is preferably provided with upright portions, which have said inclined faces and extend at least in said vertical direction, and, in correspondence therewith, the housing is preferably provided with insertion portions, which have said counterpart inclined faces and into which said upright portions are inserted.

According to the connector assembly of this aspect, when the second member is attached to the first member, the upright portions provided on the substrate can be inserted into the insertion portions of the housing, thereby making it possible to more precisely guide and position the second member relative to the first member.

In the above-mentioned connector assembly, the upright portions may include locking portions provided on the substrate.

In the above-mentioned connector assembly, the resilient members may be contacts.

The connector assembly of this aspect makes it possible to reduce the number of parts.

In the above-mentioned connector assembly, the connector assembly may be a photoelectric communication module, and, in the housing, there may be provided a photoelectric conversion element electrically connected to the electrical contact portions.

While photoelectric conversion elements usually have low thermal resistance and do not readily lend themselves to reflow mounting, forming the first and second members as separate components allows for reflow mounting to be performed on the first member without having to consider thermal resistance. In addition, as a result, the photoelectric conversion element no longer needs to be provided in the counterpart connector and can be provided in the connector assembly.

Furthermore, a connector device comprising the above-mentioned connector assembly and a counterpart connector may be designed, and, in addition, in said connector device, a connecting portion, to which a portion of the counterpart connector is connected, is preferably provided from the front to the rear in the fore-and-aft direction on one end wall face in the housing, and the inclined faces preferably gradually approach said face from the rear to the front in the fore-and-aft direction.

The connector assembly of this aspect is configured such that even when the counterpart connector is unintentionally pulled out of the connector assembly, the direction of the force applied to the connecting portion of the photoelectric conversion member and the direction of inclination of the inclined faces are in an opposing relationship, as a result of which the second member is not guided along the inclined faces of the first member and, therefore, the state of attachment of the first and second members is easy to maintain.

Effects of the Invention

According to the present invention, there is provided a connector assembly, as well as a connector device utilizing the same, that allows for treatment to be performed without having to consider the above-described problems and an improvement in working efficiency and product reliability can be achieved even when components having certain problems, for example, components having a low thermal or chemical resistance, etc., must be provided in the connector assembly, etc.

BRIEF DESCRIPTION OF THE DRAWINGS

FIG. 7(a) shows an initial step, FIG. 7(b) shows an intermediate step, and FIG. 7(c) shows a final step.

DETAILED DESCRIPTION

A connector assembly according to a preferred embodiment of the present invention and a connector device utilizing the same will be described below with reference to the accompanying drawings. Although this Specification makes reference to a photoelectric communication module as an example of the connector assembly and, in addition, to an optical connector device as an example of the connector device, respectively, the present invention is, of course, not intended to be limited to these embodiments. The present invention can also be suitably applied, for example, to electrical modules or electrical connector devices and the like.

Figure 1:
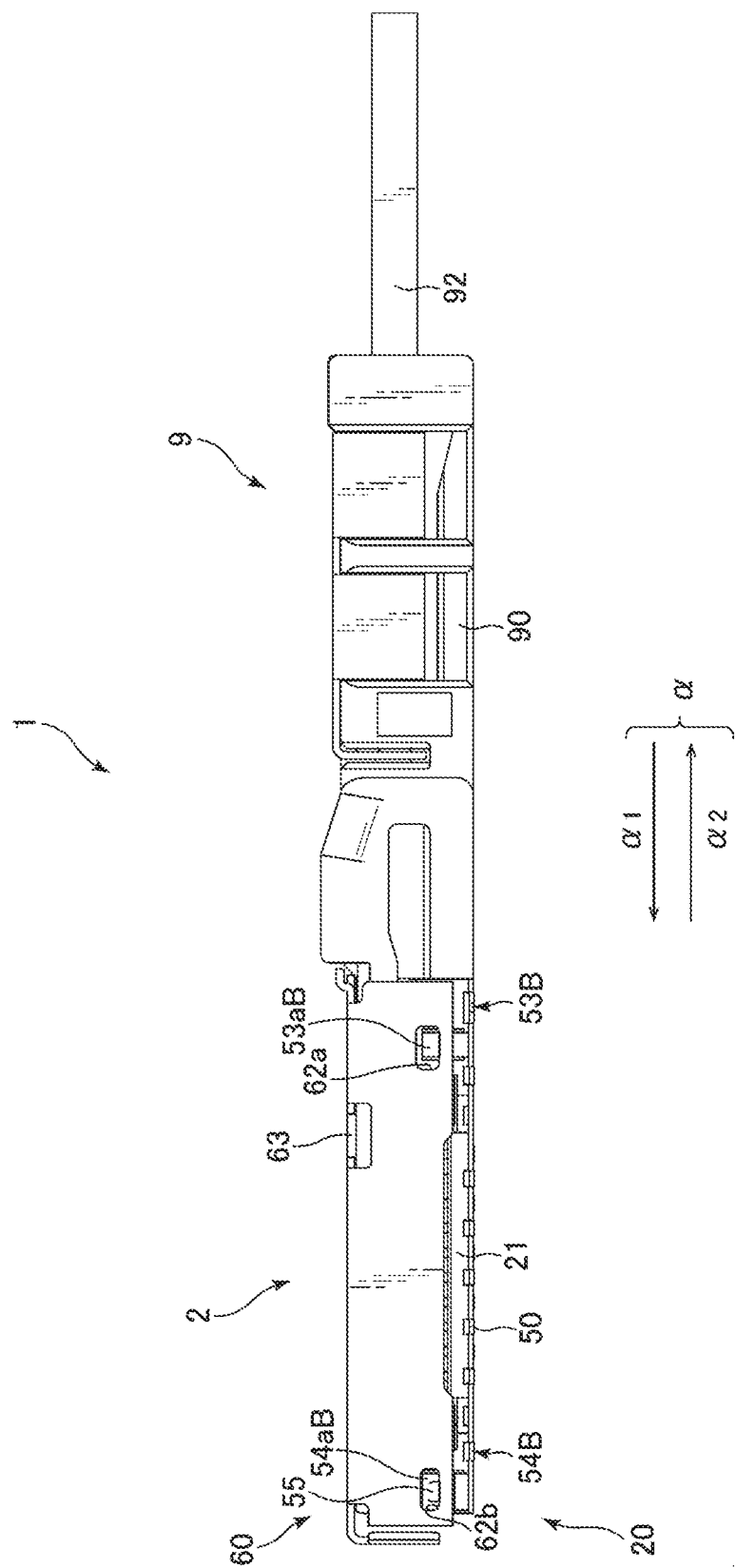
FIG. 1 illustrates a side view illustrating an optical connector device comprising an optical receptacle connector and an optical plug connector, in accordance with an example implementation.

FIG. 1 shows a side view of an optical connector device 1 comprising an optical receptacle connector (first connector) 2 and an optical plug connector (second connector) 9 that can be connected thereto. In particular, FIG. 1 illustrates a state subsequent to connecting the optical plug connector 9 to the optical receptacle connector 2. The optical receptacle connector 2 and the optical plug connector 9 can be readily attached or detached from each other by bringing their front walls together or pulling them away from each other by causing the connectors to travel in the direction of arrows α1 and α2 in the drawing. An optical cable 92 extends rearwardly in the fore-and-aft direction (in the direction of arrows a) behind the optical receptacle connector 2. Although not apparent from the drawings, a plug ferrule connected to an optical fiber inside the optical cable 92 is provided protruding at the front of the main body 90 in correspondence with a connecting portion provided in the optical receptacle connector 2 at the front of the optical receptacle connector 2. When connected, the optical receptacle connector 2 and optical plug connector 9 abut each other in such a manner that the plug ferrule is inserted into the connecting portion of the optical receptacle connector 2.

Figure 2:
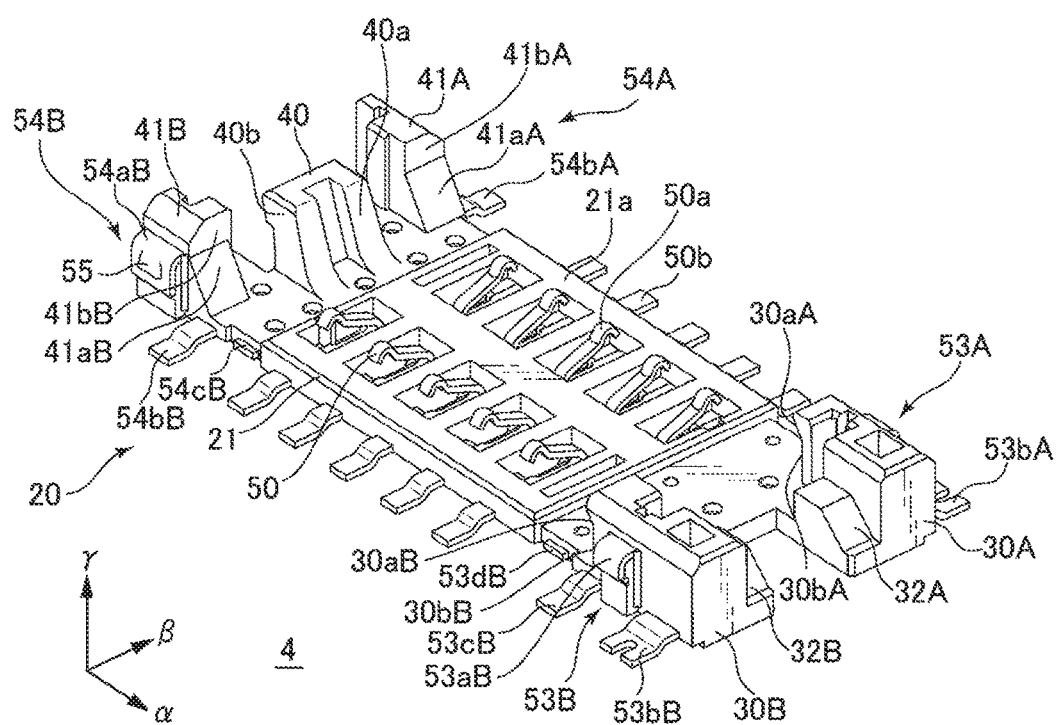
FIG. 2 illustrates a perspective view of a board anchoring member, in accordance with an example implementation.
Figure 3:
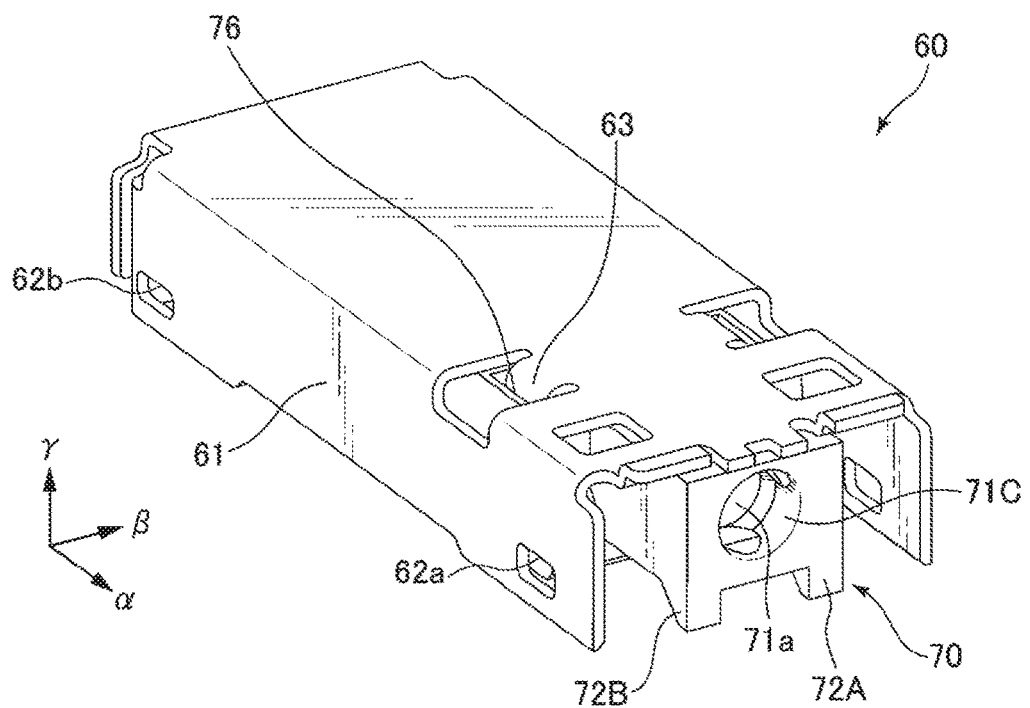
FIG. 3 illustrates a perspective view of a photoelectric conversion member, in accordance with an example implementation.

The optical receptacle connector, in other words, the photoelectric communication module 2, includes a board anchoring member (first member) 20 and a photoelectric conversion member (second member) 60 that can be attached thereto. While not apparent from the drawings, the size of the board anchoring member 20 and the photoelectric conversion member 60 is approximately 18 mm (in the fore-and-aft direction) by approximately 7 mm (in the side-to-side direction). FIG. 2 shows a perspective view of the board anchoring member 20 and FIG. 3 shows a perspective view of the photoelectric conversion member 60. Except as specifically described herein, the board anchoring member 20 and photoelectric conversion member 60 may be construed as having a bilaterally symmetrical shape. When the left and right sides need to be distinguished in the descriptions and drawings hereinbelow, the distinction is made by adding the letters A or B after the reference numerals.

The board anchoring member 20 is anchored to the surface of the board 4 and the photoelectric conversion member 60 is attached to this board anchoring member 20. When the board anchoring member 20 is anchored to the surface of the board 4, it is convenient to use heat treatment such as soldering, reflow, and the like. When such heat treatment is utilized, it is preferable to attach the photoelectric conversion member 60 to the board anchoring member 20 after performing the operation of anchoring of the board anchoring member 20. Although the photoelectric conversion member 60 normally includes a photoelectric conversion element and other components having a low thermal resistance, following the above-described operating procedure allows for the operation of anchoring to be accomplished with ease without inducing any thermal stress in the photoelectric conversion member 60, in other words, without having to consider the problem of thermal resistance.

Figure 4:
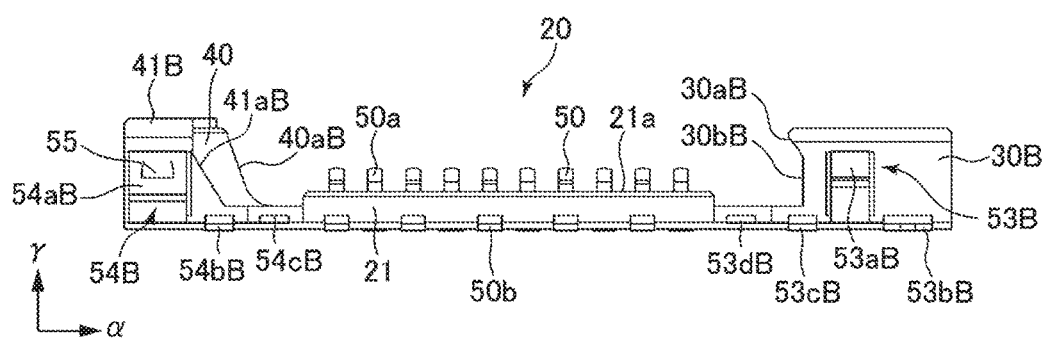
FIG. 4 illustrates a side view of the board anchoring member, in accordance with an example implementation.
Figure 5:
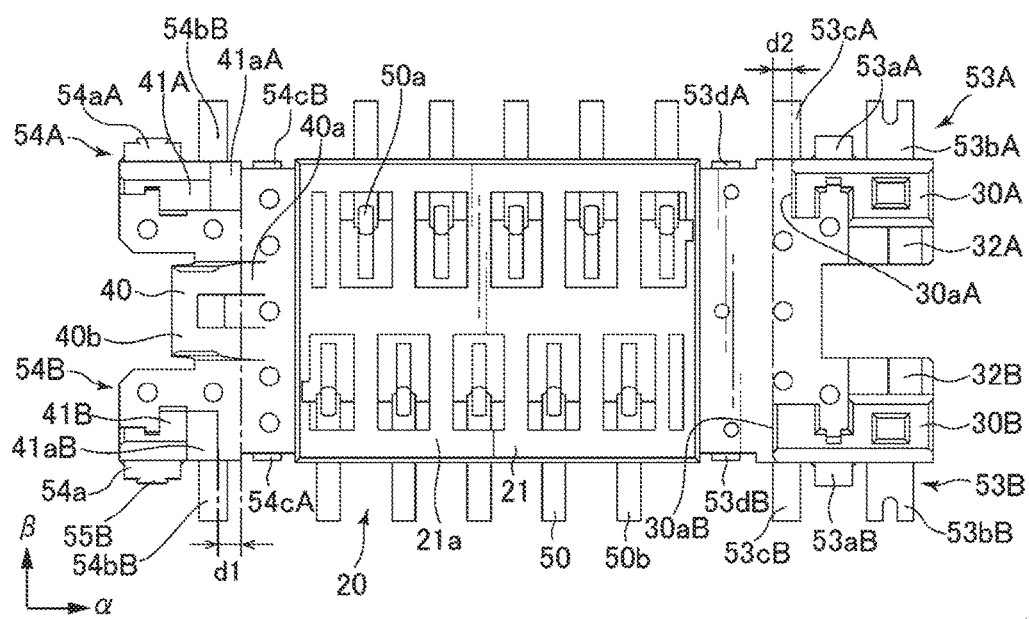
FIG. 5 illustrates a plan view of the board anchoring member, in accordance with an example implementation.

The board anchoring member 20 will now be described with reference to FIG. 2 along with FIG. 4 and FIG. 5. FIG. 4 is a side view of the board anchoring member 20 and FIG. 5 is a plan view thereof. The board anchoring member 20 includes a plastic substrate 21 formed by unitary molding, fittings 53 and 54 incorporated into the substrate 21 by unitary molding, and multiple contacts 50 incorporated into the substrate 21 by unitary molding.

The substrate 21 has a face 21a, which is substantially rectangular when viewed in plan and extends in the fore-and-aft direction α as well as in the side-to-side direction (in the direction of arrow β in the drawing). On this face 21a, there are provided multiple upright portions 30, 41, and 40, which extend at least in the vertical direction (in the direction of arrow γ), and, additionally, front upright portions 30A and 30B, positioned forwardly in the fore-and-aft direction α, rear upright portions 41A and 41B, positioned rearwardly in the fore-and-aft direction α, and, furthermore, a central upright portion 40, positioned rearwardly in the fore-and-aft direction α and, at the same time, in the center in the side-to-side direction β.

The upright portions 30, 41, and 40 are respectively provided with inclined faces 30a, 41a, and 40a, and, furthermore, inclined faces 32A and 32B are respectively provided in the inboard sections of the upright portions 30A and 30B. All of these inclined faces 30a, 41a, 40a, and 32 are formed so as to gradually approach the face 21a from the rear to the front in the fore-and-aft direction α. Providing the inclined faces 30a, 41a, 40a, and 32 allows for the photoelectric conversion member 60 to be effectively guided to a predetermined location of the board anchoring member 20 when the photoelectric conversion member 60 is attached to the board anchoring member 20. There are no particular restrictions as to the locations where the inclined faces are provided, and they can be provided at appropriate locations depending on the configuration of the device. However, from the standpoint of stability, it is preferable to provide them in the center in the side-to-side direction β or on at least one of said left and right sides. Locking portions 40b, by which predetermined sections of the photoelectric conversion member 60 (convex portions 74b illustrated in the hereinafter-described FIG. 10 et seq.) are engaged when the photoelectric conversion member 60 is attached to the board anchoring member 20, are provided facing toward the rear in the vicinity of the upper distal end of the central upright portion 40. However, it is not necessary to provide the locking portions 40b.

In order to prevent mismating, the positions of the inclined faces provided on the left and right sides may be slightly shifted in the fore-and-aft direction α. For example, as best shown in FIG. 5, the forwardly provided inclined face 30aA is provided so as to be slightly shifted forward in the fore-and-aft direction α by distance d2 relative to the inclined face 30aB, and, on the other hand, the inclined face 41aA is provided so as to be slightly shifted forward in the fore-and-aft direction α by distance d1 relative to the inclined face 41aB.

The contacts 50, while being oriented in the side-to-side direction β, are disposed in a staggered manner in the fore-and-aft direction α on the right and left sides of the substrate 21. The contacts 50 are formed by unitary molding with the substrate 21. Each contact 50 is bent in a substantially dog-leg configuration, with one end 50a formed as a free end and the other end 50b as a fixed end. The anchoring points 59b are anchored to the surface of the board 4 using, for example, solder or the like. The free ends 50a can display resilience at least in the vertical direction γ relative to the face 21a of the substrate 21. When the photoelectric conversion member 60, while being guided along the inclined faces 30a, etc., comes within a predetermined distance of the face 21a, the contacts 50, in the vicinity of their free ends 50a, are brought into physical contact with, and electrically connected to, predetermined sections of the photoelectric conversion member 60 (electrical contact portions 80a illustrated in the hereinafter-described FIG. 6 et seq.), and the photoelectric conversion member 60 is biased in the vertical direction γ away from the face 21a of the substrate 21.

The fittings 53A, 53B, 54A, and 54B are respectively integrally molded with the upright portions 30A, 30B, 41A, and 41B provided in the four corners of the face 21a of the substrate 21. It is preferable to provide the fittings 53 and 54 such that the fittings are spaced apart in the fore-and-aft direction α. As a result, anchoring is performed in at least 2 locations in the fore-and-aft direction α and the photoelectric conversion member 60 can be attached to the board anchoring member 20 in a more stable manner.

The front fittings 53A and 53B respectively include outwardly displaceable locking portions 53a, board anchoring portions 53b and 53c disposed on each side in the fore-and-aft direction α while sandwiching the locking portions 53a in the center, and expanding anchoring pieces 53d disposed rearwardly of the board anchoring portions 53c. When the photoelectric conversion member 60, while being guided along the inclined faces 30a, etc., comes within a predetermined distance of the face 21a, predetermined sections of the photoelectric conversion member 60 (locking apertures 62a illustrated in FIG. 3 et seq.) are brought into engagement with the locking portions 53a. In such a case, the locking portions 53a provide a grounding function because the locking portions 53a are electrically connected to the photoelectric conversion member 60. The board anchoring portions 53b, 53c are anchored to the surface of the board 4 by soldering or the like. The expanding anchoring pieces 53d are intended to enhance the anchoring force by expanding the region of anchoring to the substrate 21.

On the other hand, the rear fittings 54A and 54B respectively include outwardly displaceable locking portions 54a, board anchoring portions 54b disposed forwardly of the locking portions 54a in the fore-and-aft direction α, and expanding anchoring pieces 54d disposed forwardly of the board anchoring portions 54b. When the photoelectric conversion member 60, while being guided along the inclined faces 30a, etc., comes within a predetermined distance of the face 21a, predetermined sections of the photoelectric conversion member 60 (locking apertures 62b illustrated in FIG. 3 et seq.) are brought into engagement with the locking portions 54a.

In such a case, the locking portions 54a provide a grounding function because the locking portions 54a are electrically connected to the photoelectric conversion member 60. The board anchoring portions 54b are anchored to the surface of the board 4 by soldering or the like. The expanding anchoring pieces 54d are intended to enhance the anchoring force by expanding the region of anchoring to the substrate 21.

Although not apparent from the drawings, the fittings 53 and 54 are formed in an integral manner by punching a thin metal sheet. Forming the fittings in an integral manner can enhance the anchoring force. In addition, making the fittings from thin sheet metal facilitates manufacture and, furthermore, making them from sheet metal can eliminate chipping, damage during locking, and other problems. As far as the locking portions 54a are concerned, embossed portions 55 are formed by embossing the area in the center thereof to provide for a more reliable ground connection to predetermined sections of the photoelectric conversion member 60 (shell 61 illustrated in FIG. 3 et seq.).

As can be seen, the fittings 53 and 54 provide locking, anchoring, and, furthermore, grounding functions. Of course, these functions may be implemented using individual discrete members. However, in order to decrease the number of parts, it is preferable to realize these functions with the help of a single member, such as the fittings 53 and 54.

Figure 6:
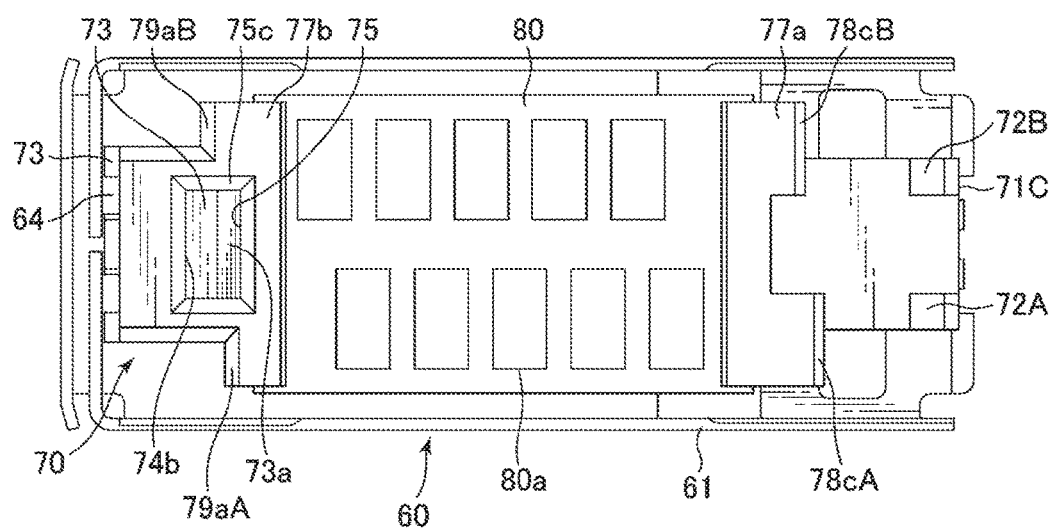
FIG. 6 illustrates a bottom view of the photoelectric conversion member, in accordance with an example implementation.

The photoelectric conversion member 60 will be described next with reference to FIG. 6 along with FIG. 3. FIG. 6 shows a bottom view of the photoelectric conversion member 60. The photoelectric conversion member 60 includes a plastic housing 70, a metal shell 61 covering at least a portion of the exterior surface of the housing 70, and a device substrate 80 attached to the bottom of the housing 70.

The housing 70, which is formed by unitary molding from transparent resin, is translucent. Despite having an end wall face 71C of a smaller width in front, the housing 70 is generally of a substantially rectangular shape, and a receiving through hole 71a, where the plug ferrule of the optical plug connector 9 is inserted and connected, is provided in this front end wall face 71C in the fore-and-aft direction α.

As best shown in FIG. 6, substrate retaining portions 77a and 77b, which hold the respective fore-and-aft edges of the device substrate 80, are formed in the bottom face of the housing 70. Furthermore, tapers 78c and inclined faces (tapers) 79a, which are used to guide the photoelectric conversion member 60 such that the photoelectric conversion member 60 is attached to the board anchoring member 20 in a problem-free manner, are respectively provided on the left and right edges of these substrate retaining portions 77a and 77b.

In addition, an insertion portion 73, into which the central upright portion 40 provided on the substrate 21 is inserted, is provided in the rear bottom face of the housing 70. A counterpart inclined face 73a, which can abut the inclined face 40a provided in the central upright portion 40, is provided in the insertion portion 73 as a continuation of an insertion aperture 75. A taper 75c, which guides the central upright portion 40, is preferably provided on the edge of the insertion aperture 75. When the photoelectric conversion member 60 is attached to the board anchoring member 20, the photoelectric conversion member 60 is precisely guided and positioned relative to the board anchoring member 20 by inserting the central upright portion 40 provided on the substrate 21 into the insertion portion 73.

The device substrate 80, with its bottom face exposed, is secured in place near the center of the housing 70 by the substrate retaining portions 77. The device substrate 80 may be of a flat shape. A photoelectric conversion element (not illustrated in the drawing) is disposed on its upper face and multiple electrical contact portions 80a, which correspond to the contacts 50, are formed on its bottom face. Although not apparent from the drawings, the electrical contact portions 80a are respectively electrically connected to the photoelectric conversion element on the device substrate 80. When the photoelectric conversion member 60 is attached to the board anchoring member 20, these electrical contact portions 80a make electrical contact with the contacts 50 of the board anchoring member 20, as a result of which the photoelectric conversion element, which is electrically connected to the electrical contact portions 80a, is electrically connected to the contacts 50 and, furthermore, to the board connected to the contacts 50. In addition, at such time, as a result of contact with the contacts 50, the device substrate 80 is biased mainly in the vertical direction $\gamma$ away from the face 21a of the substrate 21.

As best shown in FIG. 3, the metal shell 61 substantially covers practically all of the exterior surface of the housing 70 with the exception of the front and bottom sides thereof. Cutouts in a substantially U-shape are made in portions of the upper face of the metal shell 61, with their distal ends downwardly bent, inserted, and secured in place in openings 76 in the housing 70. In addition, as a result of being inwardly bent, a portion 64 of the rear face of the metal shell 61 is secured in an indentation 74 provided in the rear end wall 71D of the housing 70. Counterpart locking portions 62a and 62b in the form of locking apertures, for example, are provided on the left and right lateral walls of the housing 70 in correspondence with the locking portions 53a and 54a provided in the board anchoring member 20. In this manner, when the counterpart locking portions 62a and 62b are provided with the help of the metal shell 61, along with ensuring strength, it is possible to impart resilience to the counterpart locking portions 62a and 62b by forming the metal shell 61 from a relatively thin sheet of metal. However, the counterpart locking portions do not necessarily have to be provided in the metal shell 61 and may be provided, for example, in the housing 70. The group of locking means made up of the locking portions 53a and counterpart locking portions 62a and the group of locking means made up of the locking portions 54a and counterpart locking portions 62b are preferably provided such that they are spaced apart from each other in the fore-and-aft direction $\alpha$. When the photoelectric conversion member 60 is attached to the board anchoring member 20, the photoelectric conversion member 60 is anchored by these locking means in a manner stabilized relative to the board anchoring member 20 in the fore-and-aft direction $\alpha$.

The process of attachment of the photoelectric conversion member 60 to the board anchoring member 20 will be described primarily with reference to FIGS. 7 to 11.

Figure 7A:
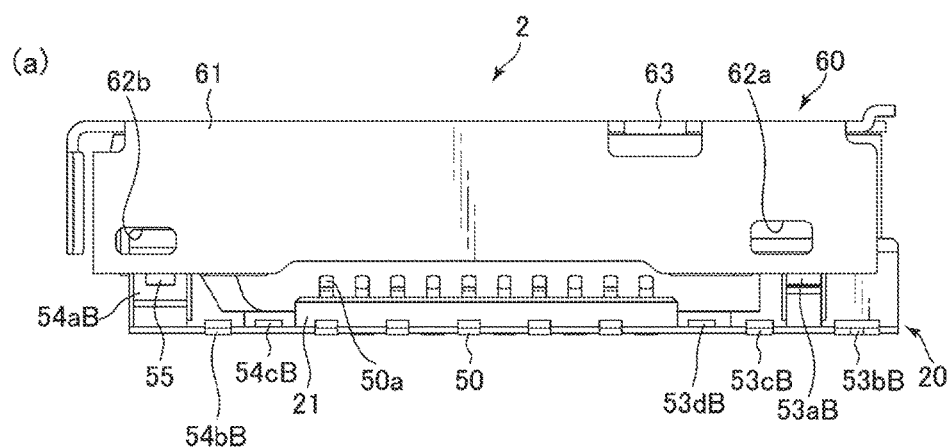
FIGS. 7(a) to 7(c) illustrates side views illustrating the process of attachment in a step-by-step manner in accordance with an example implementation, where
Figure 7B:
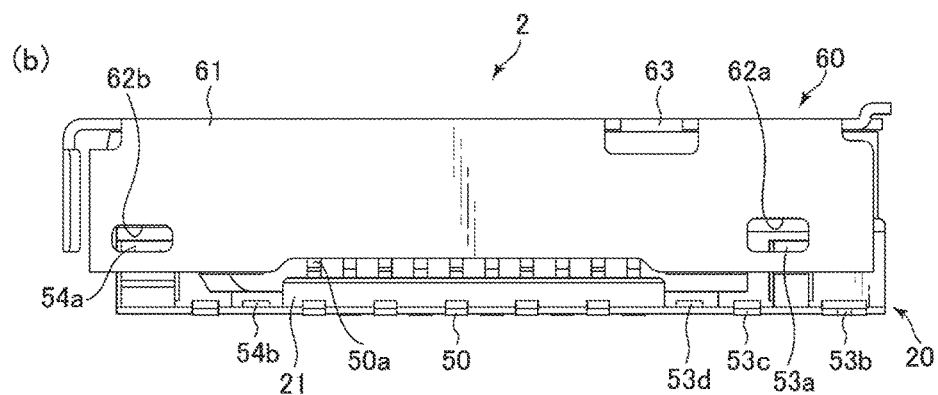
Figure 7C:
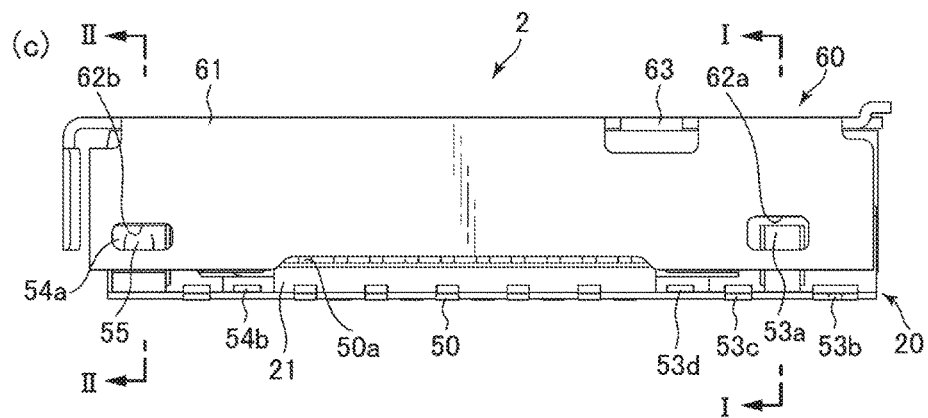
Figure 8A:
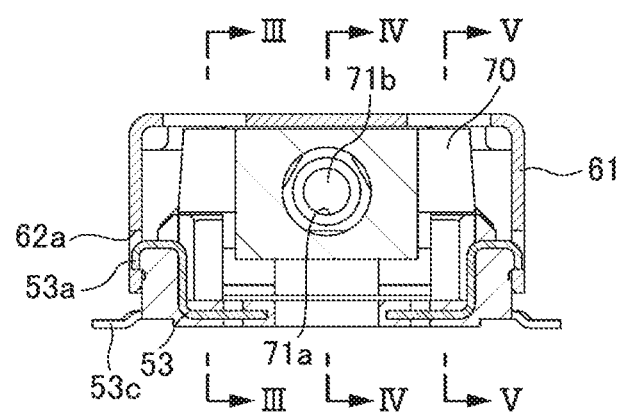
FIG. 8(a) is a cross-sectional view taken along line I-I in FIG. 7(c)
Figure 8B:
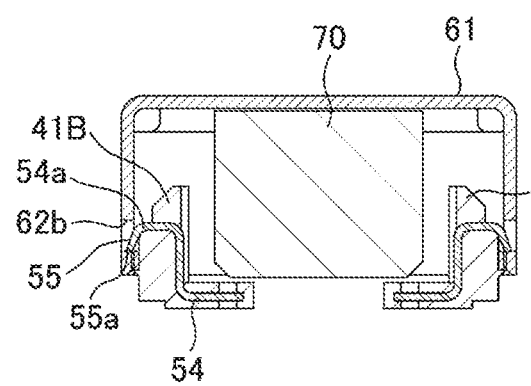
FIG. 8(b) is a cross-sectional view taken along line II-II in FIG. 7(c), in accordance with an example implementation.

FIGS. 7(a) to 7(c) shows side views illustrating the process of attachment in a step-by-step manner, where FIG. 7(a) shows an initial step, FIG. 7(b) shows an intermediate step, and FIG. 7(c) shows a final step. FIG. 8(a) is a cross-sectional view taken along line I-I in FIG. 7(c), and FIG. 8(b) is a cross-sectional view taken along line II-II in FIG. 7(c).

Figure 9A:
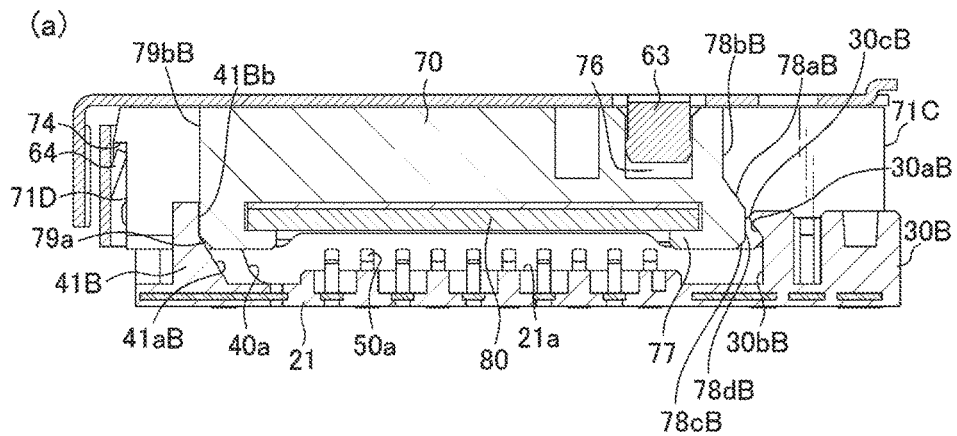
FIGS. 9(a) to 9(c) illustrate cross-sectional views taken along line in FIG. 8(a) and illustrates the attachment process in a step-by-step manner from FIGS. 9(a) to 9(c) in correspondence with FIG. 7(a)-(c).
Figure 9B:
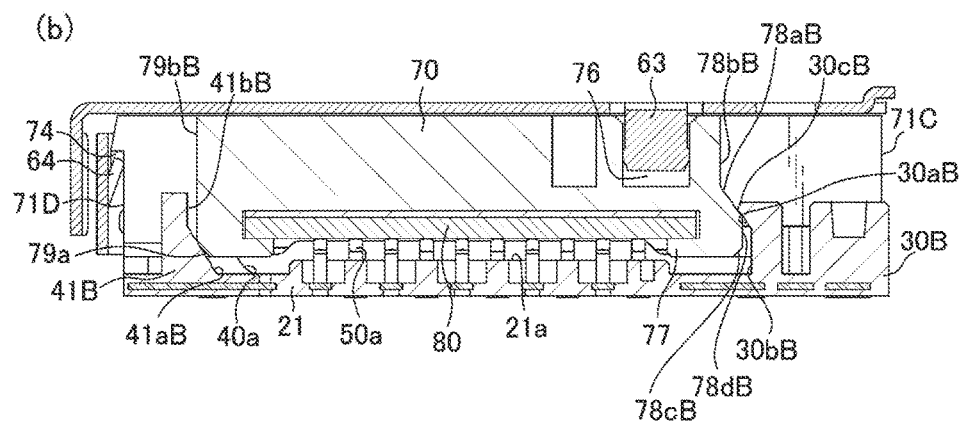
Figure 9C:
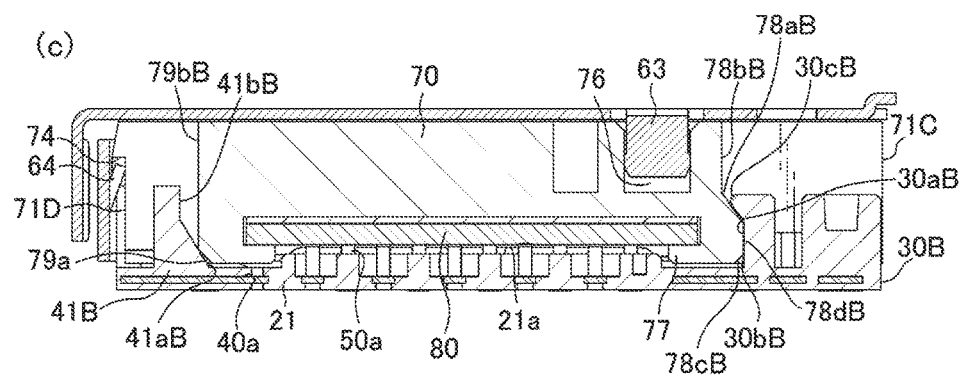
Figure 10A:
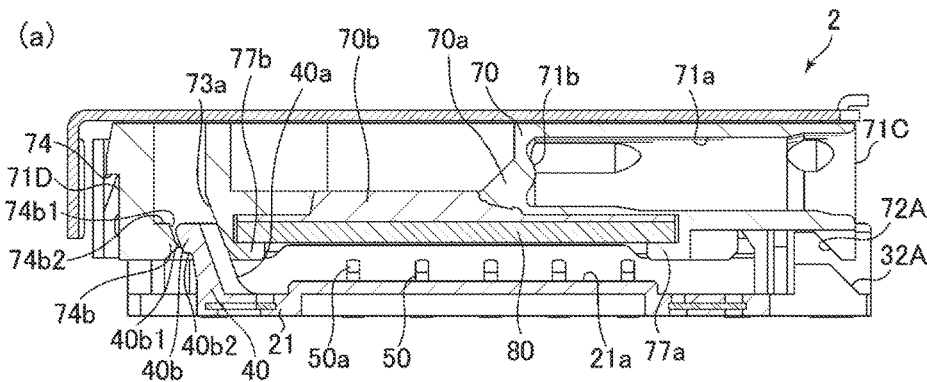
FIGS. 10(a) to 10(c) illustrate cross-sectional views taken along line IV-IV in FIG. 8(a) and illustrates the attachment process in a step-by-step manner from FIGS. 10(a) to 10(c) in correspondence with FIG. 7(a)-(c).
Figure 10B:
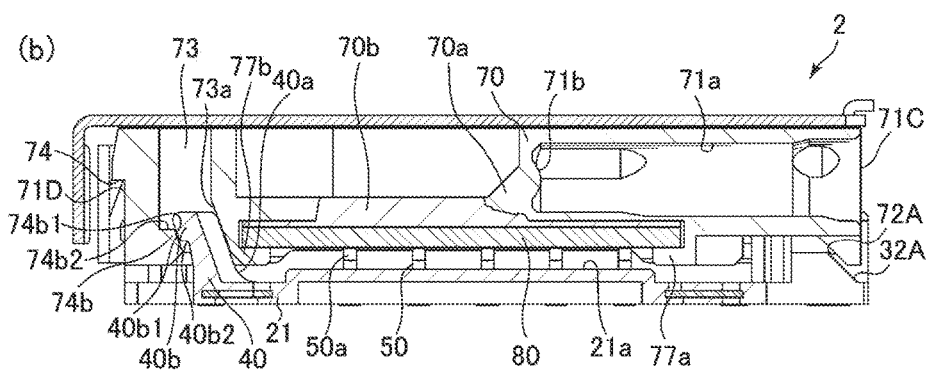
Figure 10C:
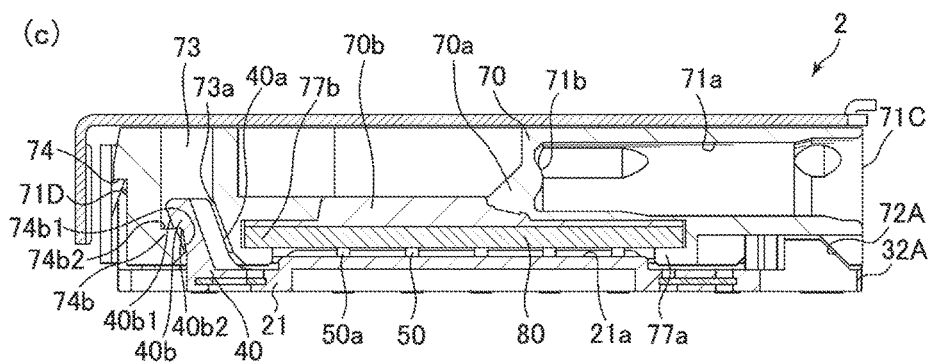

FIGS. 9(a) to 9(c) shows cross-sectional views taken along line in FIG. 8(a) and illustrates the attachment process in a step-by-step manner from FIGS. 9(a) to 9(c) in correspondence with FIG. 7(a)-(c); FIGS. 10(a) to 10(c) shows cross-sectional views taken along line IV-IV in FIG. 8(a) and illustrates the attachment process in a step-by-step manner from FIGS. 10(a) to 10(c) in correspondence with FIG. 7(a)-(c); and FIGS. 11(a) to 11(c) shows cross-sectional views taken along line V-V in FIG. 8(a) and illustrates the attachment process in a step-by-step manner from FIGS. 11(a) to 11(c) in correspondence with FIG. 7(a)-(c).

In the initial step illustrated in the respective flow diagrams (a) of FIG. 7(a) and FIGS. 9(a) to 11(a), the device substrate 80 is not yet in contact with the contacts 50.

Figure 11A:
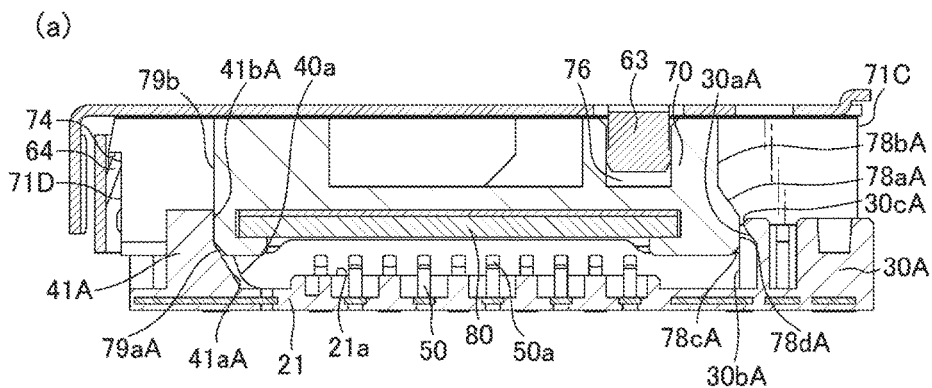
FIGS. 11(a) to 11(c) illustrate cross-sectional views taken along line V-V in FIG. 8(a) and illustrates the attachment process in a step-by-step manner from 11(a) to 11(c) in correspondence with FIG. 7(a)-(c).
Figure 11B:
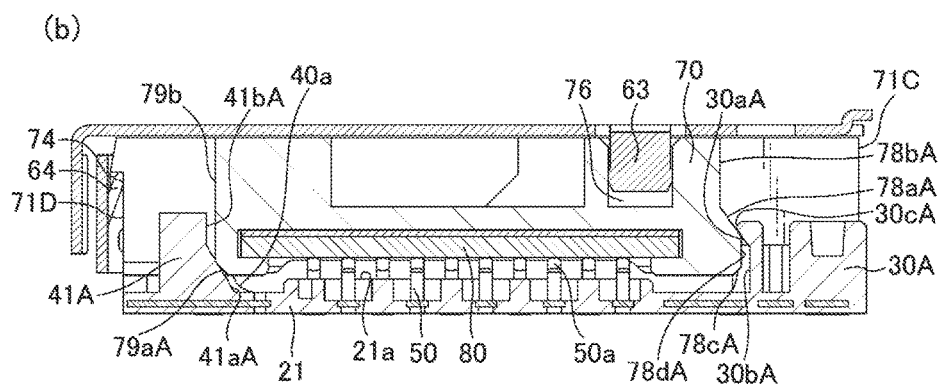
Figure 11C:
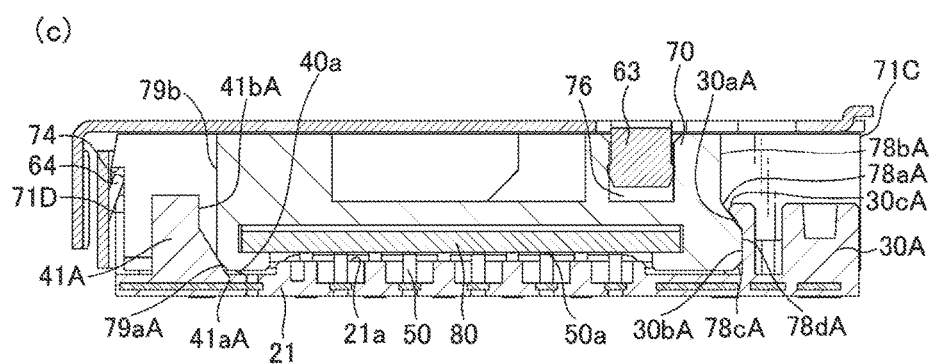

At such time, in front, as best shown in FIG. 9(a) and FIG. 11(a), the photoelectric conversion member 60 is guided by the board anchoring member 20 as a result of abutment of the tapers 30c of the front upright portions 30 of the substrate 21 and the tapers 78c of the housing 70, and, subsequently, approaches the face 21a of the board anchoring member 20 along the vertical faces 78d of the housing 70.

On the other hand, in the rear, as best shown in FIG. 9(a) and FIG. 11(a), the photoelectric conversion member 60 is guided by the board anchoring member 20 as a result of abutment of the vertical faces 41b of the rear upright portions 41 of the substrate 21 and the inclined face 79a of the housing 70, and, at the same time, as best shown in FIG. 10, the central upright portion 40 is inserted in the insertion portion 73 of the housing 70. When the central upright portion 40 is inserted into the insertion portion 73 of the housing 70, as a result of abutment of the inclined face 40a provided on the front of the central upright portion 40 of the substrate 21 and the inclined face 73a forming the insertion portion 73 of the housing 70, and, at the same time, as a result of abutment of the inclined rear faces 40b1 of the locking portions 40b provided on the rear of the central upright portion 40 of the substrate 21 and the inclined front faces 74b1 of the counterpart locking portions provided inside the insertion portion 73 of the housing 70, for example, the convex portions 74b, the central upright portion 40 is inserted into the insertion portion 73 in a sandwiched state in the fore-and-aft direction. In this manner, when the photoelectric conversion member 60 is attached to the board anchoring member 20, the photoelectric conversion member 60 can be precisely guided and positioned relative to the board anchoring member 20 by inserting a portion provided on the substrate 21, for example, the central upright portion 40, into the insertion portion 73 of the housing 70. It should be noted that, as best shown in FIG. 10(a), there is provided a lens 71b that faces the lightemitting portion of the plug ferrule when the ferrule of the optical plug connector 9 (see FIG. 1) is inserted into the receiving through hole 71*a* provided in the housing 70 of the photoelectric conversion member 60. The housing 70 may be formed from a first resin 70*a*, which is used to make the lens 71*b*, etc., and a different second resin 70*b*.

In the intermediate step illustrated in the flow diagram (b) of each drawing, where the photoelectric conversion member 60 has further approached the face 21*a* of the substrate 21 and the device substrate 80 has been brought into contact with the contacts 50, the photoelectric conversion member 60 is biased in the vertical direction by the contacts 50 away from the face 21*a*.

At such time, in front, as best shown in FIG. 9(*b*) and FIG. 11(*b*), as a result of abutment of the inclined faces 30*a* of the front upright portions 30 of the substrate 21 and the inclined faces 78*a* of the housing 70, and, at the same time, as best shown in FIG. 10(*b*), as a result of positioning by the inclined faces 72 of the housing 70 and the inclined faces 32 provided in the inboard sections of the front upright portions 30 of the substrate 21, the photoelectric conversion member 60 further approaches the face 21*a* of the board anchoring member 20. Furthermore, for example, when during attachment the photoelectric conversion member 60 is caused to approach the board anchoring member 20 in an oblique manner, the inclined face 32 of the substrate 21 and the inclined face 72 of the housing 70 act to correct their orientation.

On the other hand, in the rear, as best shown in FIG. 9(*b*) and FIG. 11(*b*), as a result of abutment of the inclined faces 41*a* of the rear upright portions 41 of the substrate 21 and the inclined faces 79*a* of the housing 70, the photoelectric conversion member 60 is guided relative to the board anchoring member 20 and, as best shown in FIG. 10(*b*), the upright portion 40 is inserted further into the insertion portion 73 of the housing 70.

In the final step illustrated in the flow diagram (c) of each drawing, as a result of contact between the device substrate 80 and the contacts 50, the photoelectric conversion member 60 is subjected to the resilient action of the contacts 50 directed away from the face 21*a* while the locking portions 62*a*, 62*b* of the photoelectric conversion member 60 are engaged by the locking portions 53*a* and 54*a* of the board anchoring member 20.

At such time, in front, as best shown in FIG. 9(*c*) and FIG. 11(*c*), the inclined faces 30*a* of the front upright portions 30 of the substrate 21 abut the inclined faces 78*a* of the housing 70, and, at the same time, the vertical faces 30*b* of the front upright portions 30 of the substrate 21 abut the vertical faces 78*d* of the housing 70, and furthermore, as best shown in FIG. 10(*c*), the inclined faces 32 provided in the inboard sections of the front upright portions 30 of the substrate 21 approach the counterpart inclined faces 72 of the housing 70.

On the other hand, in the rear, as best shown in FIG. 9(*c*) and FIG. 11(*c*), as a result of abutment of the inclined faces 41*a* of rear upright portions 41 of the substrate 21 and the inclined faces 79*a* of the housing 70, the photoelectric conversion member 60 is completely positioned relative to the board anchoring member 20. Furthermore, as best shown in FIG. 10(*c*), the bottom faces 40*b*2 of the locking portions 40*b* provided in the central upright portion 40 of the substrate 21 abut the upper faces 74*b*2 of the convex portions 74*b* provided inside the insertion portion 73 of the housing 70, and the upright portion 40 is engaged in the insertion portion 73. Thus, providing locking means on the substrate 21 and in the housing 70 in addition to the fittings 53, 54 and the metal shell 61 can make the anchoring of the board anchoring member 20 and the photoelectric conversion member 60 more stable.

As can be seen from the foregoing discussion, the photoelectric conversion member 60 can be anchored to the board anchoring member 20 in a simple one-touch operation by pushing it in the direction of the board anchoring member 20 against the resilience of the contacts 50. At such time, due to the fact that the front upright portions 30 of the substrate 21 are provided with inclined faces 30*a*, the rear upright portions 41 with inclined faces 41*a*, the central upright portion 40 with inclined faces 40*a*, and, furthermore, that the respective inboard sections of the front upright portions 30 are provided with inclined faces 32, the photoelectric conversion member 60 can be effectively guided relative to the board anchoring member 20. Furthermore, as a result of respectively providing the inclined faces 78*a* in correspondence with inclined faces 30*a* provided on the front upright portions 30 of the substrate 21, providing the inclined faces 79*a* in correspondence with inclined faces 41*a* provided on the rear upright portions 41, providing the inclined faces 73*a* in correspondence with inclined faces 40*a* provided in the central upright portion 40, and, furthermore, providing the inclined faces 72 in correspondence with inclined faces 32 provided in the respective inboard sections of the front upright portions 30 in the housing 70, the photoelectric conversion member 60 can be guided more effectively relative to the board anchoring member 20.

In particular, in the final step illustrated in flow diagram (c), the photoelectric conversion member 60, while being biased away from the face 21*a* of the substrate 21 by the resilient action of the contacts 50, is locked to the board anchoring member 20 using locking means. For this reason, using the resilient action of the contacts 50 makes it possible to anchor the photoelectric conversion member 60 to the board anchoring member 20 in a stable manner. Furthermore, at such time, as best shown in FIG. 6(*b*), with regard to the locking portions 54*a*, it is possible to bring the locking portions 54*a* into reliable contact with the shell 61 at the distal ends 55*a* of the embossed portions 55, and, along with that, in the case of sections other than the embossed sections, it is possible to bring them into reliable surface contact with the exterior surface of the shell 61, as a result of which the ground connection of the photoelectric conversion member 60 to the shell 61 can be implemented in a more reliable manner.

In addition, in the final step, in front, the inclined faces 30*a* of the substrate 21 are located above the inclined face 78*a* of the housing 70, and, conversely, the inclined faces 32 of the substrate 21 are located below the inclined face 72 of the housing 70. On the other hand, in the rear, the inclined faces 41*a* of the substrate 21 are located below the inclined faces 79*a* of the housing 70 and the inclined faces 40*a* of the substrate 21 are located below the inclined faces 73*a* of the housing 70, and, conversely, the locking portions 40*b* of the substrate 21 are located above the locking portions 74*b* of the housing 70.

Thus, positioning the inclined faces, etc., of the board anchoring member 20 both above and below the housing 70 of the photoelectric conversion member 60 makes it possible to sandwich the photoelectric conversion member 60 with the help of predetermined sections of the board anchoring member 20 in the vertical direction and anchor the photoelectric conversion member 60 to the board anchoring member 20 in a more reliable and stable manner. In addition, once the photoelectric conversion member 60 has been attached to the board anchoring member 20, the resilient action of the contacts 50 biases photoelectric conversion member 60 in the direction of attachment of the photoelectric conversion member 60 to the board anchoring member 20, in other words, not in the inclined direction defined by the inclined faces, but in the vertical direction relative to the face 21a of the substrate 21, as a result of which the resilient action of the contacts 50 does not interfere with the state of attachment of the board anchoring member 20 and the photoelectric conversion member 60.

In addition, spacing the inclined faces 30a located above from the inclined faces 32, 41a, and 40a located below in the fore-and-aft direction α, in other words, shifting the inclined faces located above and the inclined faces located below in the fore-and-aft direction, makes it possible to anchor the photoelectric conversion member 60 to the board anchoring member 20 in a more reliable and stable manner.

Furthermore, in accordance with this arrangement, even if the plug connector 9 is unintentionally pulled from the photoelectric communication module 2 in the state of FIG. 1, the direction of the force applied to the connecting portion of the photoelectric conversion member 60, namely, the direction of arrow α2, and the direction of inclination of the inclined faces, namely, the direction of inclination approaching to the face 21a of the substrate 21 while moving in the direction of arrow α2 in the drawing are in an opposing relationship, as a result of which the photoelectric conversion member 60 is not readily guided along the inclined faces of the board anchoring member 20 and, therefore, the state of attachment of the board anchoring member and the photoelectric conversion member can be easily maintained.

It should be noted that the present invention is not limited to the above-described embodiments and various other changes are possible. For example, although in the above embodiment the resilient members provided in the board anchoring member 20 were implemented in the form of the contacts 50, the resilient members may be provided in the form of springs or the like provided separately from the contacts. In addition, the locking portions of the board anchoring member 20 may be provided on these resilient members, contacts, or the substrate. In the same manner, the counterpart locking portions of the photoelectric conversion member 60 may be provided not only in the housing, but also on the electrical contact portions. Furthermore, although in the above embodiment resilient members were used to display resilience substantially in the vertical direction γ relative to the surface of the substrate, this does not have to be the case, and the photoelectric conversion member 60 may be positioned relative to the board anchoring member 20 by displaying resilience in fore-and-aft direction α or in the side-to-side direction β. Even in such a case, maintaining a state in which the board anchoring member 20 is brought into engagement with the photoelectric conversion member 60 and the resilient members are biased makes it possible to anchor the photoelectric conversion member to the board anchoring member in a stable manner. It should be noted that when resilient action is displayed in the fore-and-aft direction α or in the side-to-side direction β, from the standpoint of stability, it is preferable for resilient action to be displayed both in the fore-and-aft direction and in the side-to-side direction. Furthermore, the abutment of the inclined faces does not need to be complete across the surface, and it is sufficient for such abutment to take place to the extent useful for guiding the photoelectric conversion member to a predetermined location of the board anchoring member.

DESCRIPTION OF THE REFERENCE NUMERALS

1 Connector device
4 Surface of the board
2 Photoelectric communication module (first connector)
9 Plug connector (second connector)
20 Board anchoring member (first member)
21 Substrate
21a Face
30 Front upright portion
30a Inclined face
32 Inclined face
40 Central upright portion
40a Inclined face
40b Locking portion
41 Rear upright portion
41a Inclined face
50 Contact
53 Fitting
53a Locking portion
54 Fitting
54a Locking portion
55 Embossed portion
60 Photoelectric conversion member (second member)
61 Shell
62 Counterpart locking portion
70 Housing
71a Connecting portion
71C End wall face
72 Counterpart inclined face
73 Insertion portion
73a Counterpart inclined face
74b Counterpart locking portion
78a Counterpart inclined face
79a Counterpart inclined face
80 Device substrate (electrical connection portion)

The invention claimed is:

1. A connector assembly comprises a first member and a second member capable of being attached to the first member, wherein:
the first member comprises:
a substrate having a face extending in fore-and-aft and side-to-side directions,
resilient members,
a plurality of contacts, and
locking portions,
wherein the substrate is provided with inclined faces gradually approaching said face in the fore-and-aft direction;
the second member comprises:
a housing,
electrical contact portions,
and counterpart locking portions disposed on at least a wall face of the housing extending in the fore-and-aft direction and configured to engage with the locking portions through the wall face of the housing extending in the fore-and-aft direction;
wherein as the second member is guided along the inclined faces and approaches said face, the plurality of contacts and electrical contact portions are brought into electrical contact and the second member is biased as a result of contact with the resilient members while at the same time maintaining a state in which the counterpart locking portions of the second member are engaged by the locking portions of the first member and the second member is biased by the resilient members.

2. The connector assembly according to claim 1, wherein the resilient members display resilience at least in the vertical direction relative to said face, and, as a result of contact with the resilient members, the second member is biased at least away from said face.

3. The connector assembly according to claim 2, wherein at least a portion of the inclined faces are located above a portion of the housing and, at the same time, at least another portion of the inclined faces are positioned below another portion of the housing when the counterpart locking portions of the second member are engaged at least by the locking portions of the first member.

4. The connector assembly according to claim 3, wherein the inclined faces located above and the inclined faces located below are provided so as to be spaced apart from each other in the fore-and-aft direction.

5. The connector assembly according to claim 1, wherein the inclined faces are provided in at least one location in the side-to-side direction at the center and/or on at least one of the left and right sides.

6. The connector assembly according to claim 1, wherein at least two groups of the locking portions and the counterpart locking portions are provided so as to be spaced apart from each other in the fore-and-aft direction.

7. The connector assembly according to claim 1, wherein the locking portions are provided in fittings attached to the substrate, and/or the counterpart locking portions are provided in a metal shell covering at least a portion of the exterior surface of the housing.

8. The connector assembly according to claim 1, wherein the locking portions are formed as part of the substrate and the counterpart locking portions are formed as part of the housing.

9. The connector assembly according to claim 1, wherein counterpart inclined faces corresponding to the inclined faces are provided in the housing.

10. The connector assembly according to claim 9, wherein the substrate is provided with upright portions, which have said inclined faces and extend at least in said vertical direction, and, in correspondence therewith, the housing is provided with insertion portions, which have said counterpart inclined faces and into which said upright portions are inserted.

11. The connector assembly according to claim 10, wherein the locking portions are provided in fittings attached to the substrate, and/or the counterpart locking portions are provided in a metal shell covering at least a portion of the exterior surface of the housing, wherein the upright portions include the locking portions.

12. The connector assembly according to claim 1, wherein the resilient members are contacts.

13. The connector assembly according to claim 12, wherein the connector assembly is a photoelectric communication module, and, in the housing, there is provided a photoelectric conversion element that is electrically connected to the electrical contact portions.

14. A connector device comprising the connector assembly according to claim 1, and a counterpart connector.

15. The connector device according to claim 14, wherein a connecting portion, to which a portion of the counterpart connector is connected, is provided from the front to the rear in the fore-and-aft direction on one end wall face in the housing, and the inclined faces gradually approach said face from the rear to the front in the fore-and-aft direction.

* * * * *